(12) United States Patent
Plondke et al.

(10) Patent No.: US 8,843,730 B2
(45) Date of Patent: Sep. 23, 2014

(54) EXECUTING INSTRUCTION PACKET WITH MULTIPLE INSTRUCTIONS WITH SAME DESTINATION BY PERFORMING LOGICAL OPERATION ON RESULTS OF INSTRUCTIONS AND STORING THE RESULT TO THE DESTINATION

(75) Inventors: Erich J. Plondke, Austin, TX (US); Lucian Codrescu, Austin, TX (US); Mao Zeng, Austin, TX (US); Charles Joseph Tabony, Austin, TX (US); Suresh K. Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 13/228,601

(22) Filed: Sep. 9, 2011

(65) Prior Publication Data
US 2013/0067205 A1 Mar. 14, 2013

(51) Int. Cl.
*G06F 9/38* (2006.01)
*G06F 9/30* (2006.01)

(52) U.S. Cl.
CPC .............. *G06F 9/38* (2013.01); *G06F 9/30094* (2013.01)
USPC .......................................... 712/223; 712/215

(58) Field of Classification Search
None
See application file for complete search history.

(56) References Cited

U.S. PATENT DOCUMENTS

| | | | | |
|---|---|---|---|---|
| 5,313,644 A | * | 5/1994 | Matsuo et al. | 712/228 |
| 5,790,826 A | * | 8/1998 | Thusoo et al. | 712/216 |
| 6,742,110 B2 | * | 5/2004 | Djafarian et al. | 712/215 |
| 7,523,295 B2 | * | 4/2009 | Codrescu et al. | 712/214 |
| 2002/0112148 A1 | | 8/2002 | Wang et al. | |
| 2004/0205326 A1 | | 10/2004 | Sindagi et al. | |
| 2005/0081017 A1 | | 4/2005 | Rupley et al. | |
| 2008/0016320 A1 | | 1/2008 | Menon et al. | |
| 2009/0235051 A1 | | 9/2009 | Codrescu et al. | |

FOREIGN PATENT DOCUMENTS

WO  2009114289  9/2009

OTHER PUBLICATIONS

Cornea-Hasegan et al.,"Correctness proofs outline for Newton-Raphson based floating-point divide and square root algorithms", Computer Arithmetic, Proceedings. 14th IEEE Symposium on, vol., No., pp. 96-105 (1999).

Huck J., et al., "Introducing the IA-64 Architecture", IEEE Micro, IEEE Service Center, Los Alamitos, CA, US, vol. 20, No. 5, Sep. 1, 2000, pp. 12-23, XP000976142, ISSN: 0272-1732, DOI: 10.1109/40.877947 p. 2-p. 3; figures 4, 5.

Intel, "Division, Square Root and Remainder Algorithms for the Intel Itanium Architecture", Application Note, Intel Itanium Processors, 120 pgs. (Nov. 2003).

Intel, "Intel Itanium Architecture Software Developer's Manual", vol. 1: Application Architecture, Revision 2.2, pp. 250 (Jan. 2006).

Intel, "Intel Itanium Architecture Software Developers Manual", vol. 3: Instruction Set Reference, Revision 2.2, pp. 986 (Jan. 2006).

(Continued)

*Primary Examiner* — Kenneth Kim
(74) *Attorney, Agent, or Firm* — Peter Michael Kamarchik; Nicholas J. Pauley; Joseph Agusta (57) ABSTRACT

An apparatus includes a processor and a memory coupled to the processor. The memory stores an instruction packet (e.g., a VLIW instruction packet) including a first predicate independent instruction and a second predicate independent instruction. Each of the predicate independent instructions has the same destination.

20 Claims, 4 Drawing Sheets

(56) References Cited

OTHER PUBLICATIONS

International Search Report and Written Opinion—PCT/US2012/054496—ISA/EPO—Nov. 7, 2012.

Kathail V., et al., "HPL Playdoh Architecture Specification: Version 1.0", HP Laboratories Technical Report, XX, XX, Feb. 1, 1994, pp. 1, 01A, 02-37, 39, XP002918902, p. 3, line 1-line 10 p. 3, line 45—p. 4, line 9 p. 7, paragraph 3.2—p. 9, paragraph 3.4 p. 19, paragraph 9—p. 25, paragraph 9.4.3.

* cited by examiner

EXECUTING INSTRUCTION PACKET WITH MULTIPLE INSTRUCTIONS WITH SAME DESTINATION BY PERFORMING LOGICAL OPERATION ON RESULTS OF INSTRUCTIONS AND STORING THE RESULT TO THE DESTINATION

I. FIELD

The present disclosure is generally related to an instruction packet including multiple instructions having a common destination.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

As the computing capabilities of electronic devices such as wireless telephones increase, the complexity of instructions to implement software applications also increases. Increased complexity of instructions may result in long instruction sequences. Thus, it may be advantageous to execute multiple instructions in parallel. Very Long Instruction Word (VLIW) architectures often execute multiple instructions simultaneously. Program code that is written sequentially may be rearranged by a scheduler to take advantage of VLIW instruction execution parallelism. For example, instructions encapsulated within a single VLIW packet may be executed in parallel. In certain simple cases, a computational instruction and a conditional instruction whose execution depends on a result of the computational instruction may be encapsulated in a single VLIW packet. For example, the result of a first instruction in the VLIW packet (e.g., a computational instruction) may be used in a second instruction in the VLIW packet (e.g., a compare instruction), However, not all conditional instructions are as simple as the example above. For example, program code may include instructions to perform a logical operation on a first result of a first compare instruction with respect to a second result of a second compare instruction. Typically, at least one extra processing cycle may be spent in executing such code. The extra processing cycle may be to perform the logical operation (e.g., an AND operation or an OR operation). Thus, execution of compound condition instructions may require one or more additional cycles when compared with simple condition instructions. In general, complex control code sequences may result in a longer sequence of instructions than simpler control code sequences. Longer sequences of instructions may take a longer time to compute, which may result in increased power consumption at an electronic device.

Various techniques have been proposed for executing complex conditional instructions efficiently. One technique involves initiating predicate registers with a value computed during a previous clock cycle or initiating predicate registers with an initial value. Such initialization is necessary because AND-typed compares may only write a logical '0' value to the predicate register and OR-typed compares may only write a logical '1' value to the predicate register. However, initializing predicate registers with values from a previous clock cycle or with an initial value may be time consuming and may increase overall code size.

III. SUMMARY

An instruction packet including multiple instructions having a common destination (e.g., a common memory location or register) is disclosed. The instruction packet may be a single VLIW packet encapsulating complex conditional instructions, such that the instructions may be executed more efficiently. A processor may execute the instruction packet to automatically perform a logical operation (e.g., an AND operation or an OR operation) of the results of two instructions that target the same destination. The results may be available for other operations within the same VLIW packet in the same clock cycle. By automatically performing a logical operation of the results of two instructions that target the same destination, simpler and denser code and fewer cycles of execution may be achieved. For example, instead of a first VLIW packet including two compare instructions and a second VLIW packet including a jump based on an AND or an OR of the results of the two compare instructions, a single VLIW packet may include both compare instructions as well as the jump. The jump instruction can be conditionally executed depending on the result of the compare instructions in the same VLIW packet. Additionally, a number of instructions used to represent the sequence may be reduced, resulting in a reduced code size.

Further, the instruction packet may be predicate independent and untyped. The instruction packet may enable automatic AND/OR operations to be performed on values generated during execution of the same instruction packet. Generally, an instruction may be considered predicate independent when any values present in the predicate register at the start of executing the instruction packet do not affect the result stored in the predicate register at the end of executing the instruction packet. Further, a first instruction and a second instruction in the VLIW instruction packet may each be untyped. Generally, an instruction may be considered untyped when the instruction is independent of and does not specify additional type/behavior information. For example, an untyped instruction may be independent of a type of the logical operation (e.g., an AND operation or an OR operation) to be performed. To illustrate, the same compare and jump opcodes may be used for untyped instructions regardless of whether the results of the instructions are to be ANDed or ORed. This is in contrast to the use of typed instructions, such as a "cmp.eq.and" instruction that can only write a logical '0' and therefore requires its destination to be initialized with a logical '0' or a "cmp.eq.or" instruction that can only write a logical '1' and therefore requires its destination to be initialized with a logical '0.' Thus, the described instruction packet may be processed without requiring previously initialized registers.

In a particular embodiment, an apparatus includes a processor and a memory coupled to the processor. The memory stores an instruction packet (e.g. a VLIW instruction packet) including a first predicate independent instruction and a second predicate independent instruction. Each of the predicate independent instructions has the same destination.

In another particular embodiment, an apparatus includes a processor and a memory coupled to the processor. The memory stores an instruction packet (e.g., a VLIW instruction packet) including a first untyped instruction and a second untyped instruction. Each of the untyped instructions has the same destination.

In another particular embodiment, a method includes retrieving, by an execution pipeline, an instruction packet (e.g. a VLIW instruction packet) stored at a memory. The instruction packet includes a first predicate independent instruction and a second predicate independent instruction. Each of the predicate independent instructions has the same destination. The method also includes processing the instruction packet (e.g., at a processor or at an execution unit) by performing a logical operation (e.g., an AND operation or an OR operation) on a first result of the first predicate independent instruction with respect to a second result of the second predicate independent instruction.

In another particular embodiment, a non-transitory computer-readable medium includes program code that, when executed by a processor, causes the processor to process an instruction packet by performing a logical operation on a first result of a first predicate independent instruction of the instruction packet with respect to a second result of a second predicate independent instruction of the instruction packet. Both the first predicate independent instruction and the second predicate independent instruction have the same destination.

In another particular embodiment, an apparatus includes means for storing an instruction packet. The instruction packet includes a first predicate independent instruction having a destination and a second predicate independent instruction having the destination. The apparatus further includes means for retrieving the instruction packet from the means for storing, and means for processing the instruction packet by performing a logical operation on a first result of the first predicate independent instruction of the instruction packet with respect to a second result of a second predicate independent instruction of the instruction packet.

One particular advantage provided by at least one of the disclosed embodiments is an ability to encapsulate multiple instructions having a common destination in a single instruction packet. Thus, complex conditional codes may be represented compactly and executed faster. Another particular advantage is that the instruction packet may leverage instruction level parallelism of VLIW architectures, resulting in reduced power consumption and reduced execution times (e.g., fewer processor cycles). Still another particular advantage provided is that compare instructions may be packetized with and executed in parallel with other instructions (e.g., logical operations, arithmetic operations, and memory load instructions) that depend on the result of the compare instructions.

Other aspects, advantages, and features of the present disclosure will become apparent after review of the entire application, including the following sections: Brief Description of the Drawings, Detailed Description, and the Claims.

V. DETAILED DESCRIPTION

Figure 1:
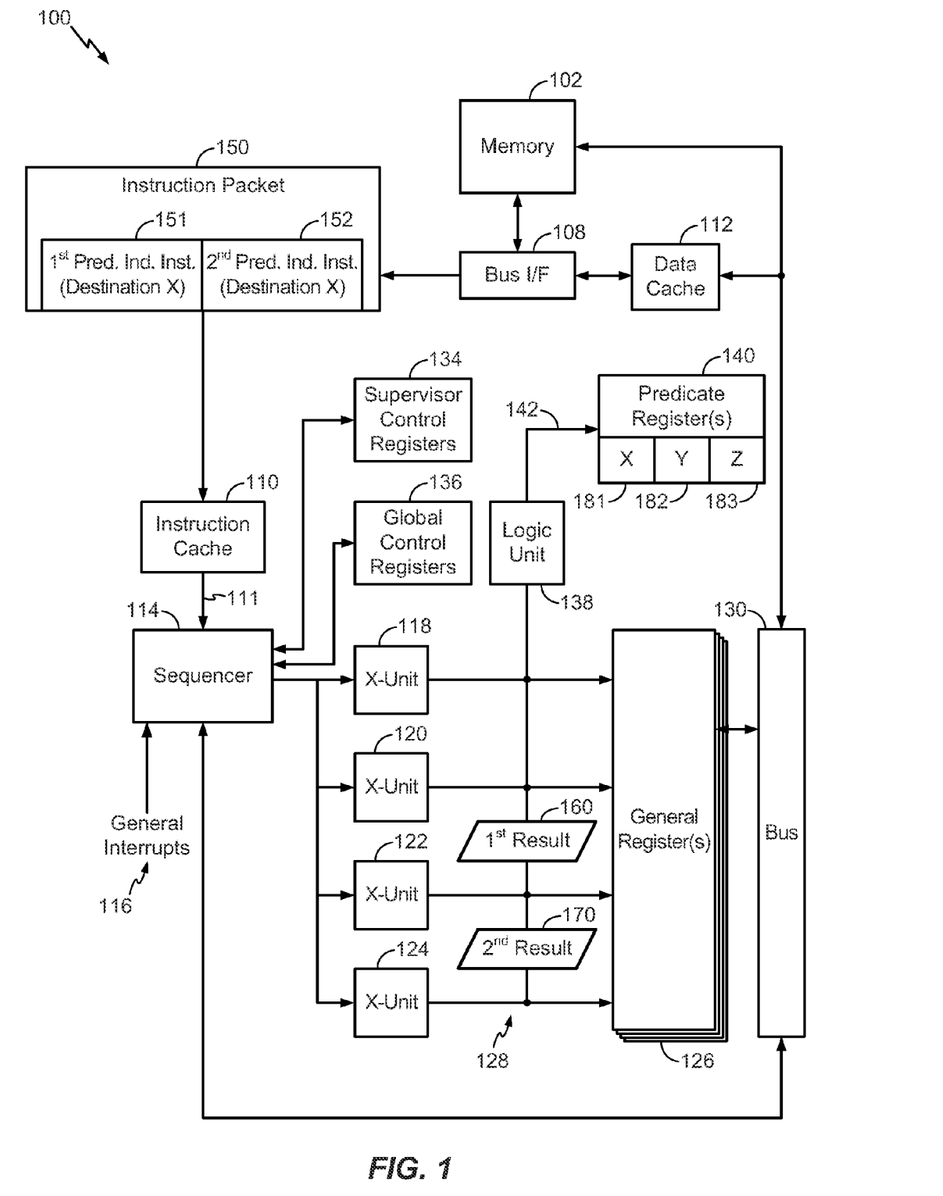
FIG. 1 is a block diagram of a particular illustrative embodiment of a system that includes a memory storing an instruction packet including multiple instructions having a common destination, the instruction packet to be executed by execution units of a processor.

Referring to FIG. 1, a particular illustrative embodiment of a system including a memory 102 storing an instruction packet 150 (e.g., a VLIW packet) including multiple instructions having a common destination is disclosed and generally designated 100. The memory 102 may be coupled to an instruction cache 110 via a bus interface 108. In a particular embodiment, the instruction packet 150 may include a first predicate independent instruction 151 and a second predicate independent instruction 152. The first predicate independent instruction 151 may be a first compare instruction and the second predicate independent instruction 152 may be a second compare instruction. In addition, the instructions 151, 152 may be untyped. The common destination may be a particular predicate register of a predicate register file 140 or another register (e.g., a register in the illustrative general register file 126) or memory location.

For example, the first predicate independent instruction 151 and the second predicate independent instruction 152 may both specify a first predicate register 181 designated 'X' of a predicate register file 140 as the common destination. The predicate register file 140 may also include a second predicate register 182 designated 'Y' and a third predicate register 183 designated 'Z.' In a particular embodiment, all or a portion of the system 100 may be integrated into a processor. Alternatively, the memory 102 and the bus 130 may be external to the processor.

The memory 102 may send the instruction packet 150 to the instruction cache 110 via the bus interface 108. A data cache 112 may also be coupled to the memory 102 via the bus interface 108, The instruction cache 110 may be coupled to a sequencer 114 via a bus 111. The sequencer 114 may receive general interrupts 116, which may be retrieved from an interrupt register (not shown). In a particular embodiment, the instruction cache 110 may be coupled to the sequencer 114 via a plurality of current instruction registers (not shown), which may be coupled to the bus 111 and associated with particular threads (e.g., hardware threads) of the processor 100. In a particular embodiment, the processor 100 may be an interleaved multi-threaded processor including six (6) threads.

In a particular embodiment, the bus 111 may be a one-hundred and twenty-eight bit (128-bit) bus and the sequencer 114 may be configured to retrieve instructions from the memory 102 via instruction packets (e.g., the instruction packet 150) having multiple instructions (e.g., the first predicate independent instruction 151 and the second predicate independent instruction 152) having a length of thirty-two (32) bits each. The bus 111 may be coupled to a first instruction execution unit 118, a second instruction execution unit 120, a third instruction execution unit 122, and a fourth instruction execution unit 124. Each instruction execution unit 118, 120, 122, and 124 may be coupled to the general register file 126 via a first bus 128. The general register file 126 may also be coupled to the sequencer 114, the data cache 112, and the memory 102 via a second bus 130.

The system 100 may also include supervisor control registers 134 and global control registers 136 to store bits that may be accessed by control logic within the sequencer 114 to determine whether to accept interrupts (e.g., the general interrupts 116) and to control execution of instructions. The system 100 may also include a logic unit 138 and the predicate register file 140, which are coupled to the execution units 118, 120, 122, and 124 via a third bus 142. In a particular embodiment, the predicate registers 181, 182, and 183 of the predicate register file 140 may be read/write 8-bit registers that store the results of compare instructions (e.g., a first result of the first predicate independent instruction 151 and a second result of the second predicate independent instruction 152).

In a particular embodiment, one of the execution units 118, 120, 122, and 124 may execute the first predicate independent instruction 151 (e.g., a first compare instruction) to produce a first result 160 of the first predicate independent instruction 151. In addition, another one of the execution units 118, 120, 122, and 124 may execute the second predicate independent instruction 152 (e.g., a second compare instruction) to produce a second result 170 of the second predicate independent instruction 152. For example, the execution unit 122 may be an arithmetic and logic unit (ALU) and may execute the first predicate independent instruction 151 to produce the first result 160 and the execution unit 124 may be an ALU and may execute the second predicate independent instruction 152 to produce the second result 170. Further, the first predicate independent instruction 151 and the second predicate independent instruction 152 may be executed in parallel by the execution unit 122 and the execution unit 124, respectively. Moreover, the first predicate independent instruction 151 and the second predicate independent instruction 152 may be executed by the execution unit 122 and the execution unit 124, respectively, during the same clock cycle.

The logic unit 138 may receive the first result 160 and the second result 170 via the third bus 142 and may automatically perform a logical operation on the first result 160 with respect with the second result 170. For example, the logical operation may be an AND operation or an OR operation. The logic unit 138 may perform the logical operation during the same execution cycle as execution of the first predicate independent instruction 151 and the second predicate independent instruction 152. In addition, the logic unit 138 may write a result of the logical operation to the predicate register file 140. For example, the result of the logical operation may be written to the first predicate register 181 designated 'X' of the predicate register file 140. The logic unit 138 may write the result of the logical operation to any of the other predicate registers (e.g., the second predicate register 182 designated 'Y' and the third predicate register 183 designated 'Z') if the predicate registers are commonly specified by the first predicate independent instruction 151 and the second predicate independent instruction 152 as a destination. In a particular embodiment, the result of the logical operation maybe a logical '1' value or a logical '0' value. Further, the logical operation may write either the logical '1' value or the logical '0' value resulting from the logical operation to any of the predicate registers.

The predicate registers 181, 182, and 183 of the predicate register file 140 do not need, to be initialized with any particular values before or during processing of the instruction packet 150, since the multiple instructions 151, 152 of the instruction packet 150 are predicate independent. Further, the predicate registers 181, 182, and 183 of the predicate register file 140 do not need to be initialized with any particular type information (i.e., an AND-type or an OR-type), since the multiple instructions 151, 152 of the instruction packet 150 may be untyped (i.e., independent of the logical operation to be subsequently performed on the respective results of the first untyped instruction and the second untyped instruction).

Thus, the system 100 of FIG. 1 may enable packetizing multiple predicate independent or untyped instructions in a single VLIW packet, where such instructions share a common destination. The system 100 of FIG. 1 may also enable performing a logical operation on the results of the predicate independent or untyped instructions during the same clock cycle that the results are generated. For example, a sample complex conditional line of source code may be:

if (not((r0 not equal to NULL) and (r1 not equal to NULL))) goto error;

The system 100 of FIG. 1 may enable encapsulating processor instructions corresponding to the above source code in a single VLIW packet, which may be executed during a single execution cycle of the processor. To illustrate, the following VLIW packet includes two compare instructions specifying a common destination predicate register p0. Although not explicitly indicated in the VLIW packet, the result of the second compare instruction may be automatically ANDed or ORed with the result of the first compare instruction (e.g., by a logic unit such as the logic unit 138 of FIG. 1).

{p0=cmp.gtu(r0,#0) p0=cmp.gtu(r1,#0) if(not p0.new) jump:nt error}

During execution of this VLIW packet, the first instruction (p0=cmp.gtu(r0,#0)) may be executed by the execution unit 122 to produce the first result 160 and the second instruction (p0=cmp.gtu(r1,#0)) may be executed by the execution unit 124 to produce the second result 170. The first result 160 and the second result 170 may be ANDed or ORed by the logic unit 138 to produce a final result that is stored in the first predicate register (p0) 181 and used for the third (i.e., jump) instruction.

In a particular embodiment, a single VLIW packet may include at least two compare instructions (e.g., predicate independent, untyped compare instructions) and may specify a destination predicate register. Upon executing the VLIW instruction packet, a result predicate stored in the destination predicate register may be set to true when each of the compare instructions has a true result. The result predicate may be set to false when any of the compare instructions has a false result. The disclosed VLIW packet and technique may thus be preferable to conventional VLIW packets and techniques, which may leave the predicate stored in the destination predicate register unchanged if all of the compare instructions have a true result.

Figure 2:
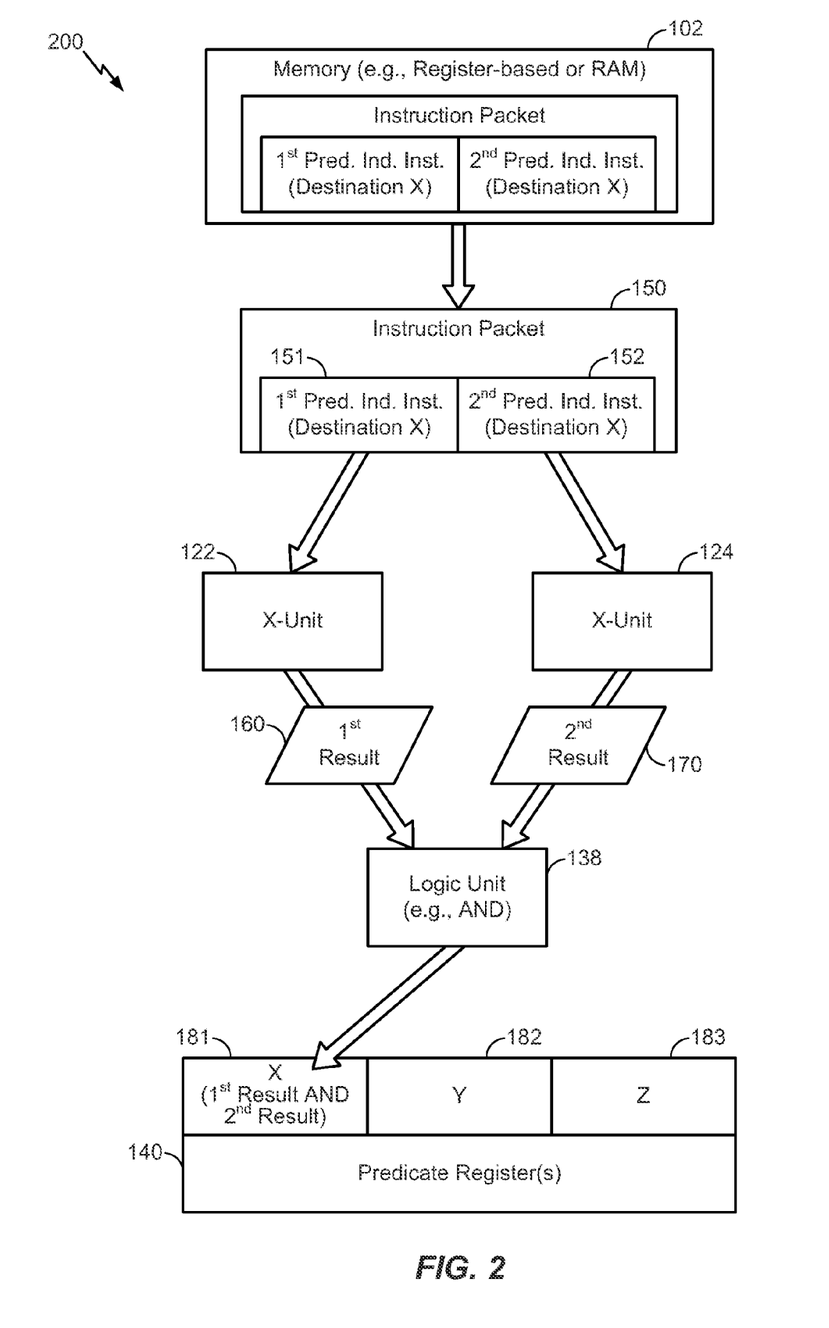
FIG. 2 is a diagram of a particular illustrative embodiment of operation of the system of FIG. 1.

Referring to FIG. 2, a particular illustrative embodiment of operation at the system 100 of FIG. 1 is disclosed and generally designated 200. During operation, the memory 102 may store the instruction packet 150 of FIG. 1, which includes multiple instructions. The memory 102 may be a register-based memory, a random access memory (RAM), or any combination thereof.

As described with reference to FIG. 1, the instruction packet 150 may include the first predicate independent instruction 151 and the second predicate independent instruction 152 having a common destination (designated 'X'). For example, the first predicate independent instruction 151 may be a first compare instruction and the second predicate independent instruction 152 may be a second compare instruction. The first predicate independent instruction 151 and the second predicate independent instruction 152 may both specify the first predicate register 181 of FIG. 1 as the common destination register (e.g., p0 in the above code example). However, any of the other predicate registers 182 or 183 of the predicate register file 140 of FIG. 1 may be the common destination register.

During operation, the execution unit 122 may receive the first predicate independent instruction 151 and the execution unit 124 may receive the second predicate independent instruction 152 for processing. In a particular embodiment, any one of the plurality of execution units 118, 120, 122, and 124 of FIG. 1 may receive any one of the first and second predicate independent instructions. The execution unit 122 and the execution unit 124 may execute the first predicate independent instruction 151 and the second predicate independent instruction 152 in parallel and during the same clock cycle.

The execution unit 122 may produce the first result 160 upon execution of the first predicate independent instruction 151, and the execution unit 124 may produce the second result 170 upon execution of the second predicate independent instruction 152. The logic unit 138 may receive the first result 160 and the second result 170 and may automatically perform a logical operation (e.g., an AND operation) of the first result 160 with respect to the second result 170. The result of the logical operation (i.e., computed result of the first result AND the second result) may be written to the common destination identified by the first predicate independent instruction 151 and the second predicate independent instruction 152. For example, the result of the logical AND operation may be written to the first predicate register 181 designated 'X.' The result of the logical AND operation may be written to the first predicate register 181 during the same execution cycle as the execution of the first predicate independent instruction 151 and the second predicate independent instruction 152. For example, the predicate independent instructions 151, 152 and the AND operation may be performed during an execute stage of the execution cycle and the result of the AND operation may be written to the first predicate register 181 during a write-back stage of the execution cycle.

In a particular embodiment, the logic unit 138 may be fixed as an AND unit. To perform an OR operation, a compiler generating the instruction packet 150 may invert the inputs and outputs of the source complex conditional instruction sequence in accordance with DeMorgan's law. Alternately, the logic unit 138 may be fixed as an OR unit. To perform an AND operation, the compiler may invert the inputs and outputs of the source complex conditional instruction sequence in accordance with DeMorgan's law.

Thus, fewer execution cycles may be used to execute an instruction packet including multiple predicate independent instructions having a common destination. Accordingly, a reduction in overall code size, a reduction in time for computing complex codes, and a reduction in power consumption may be achieved. Embedded low cost applications may benefit from smaller code size. For example, modem software, software in memory embedded in a wireless device, and other embedded processing environments may benefit from reduced code size.

Figure 3:
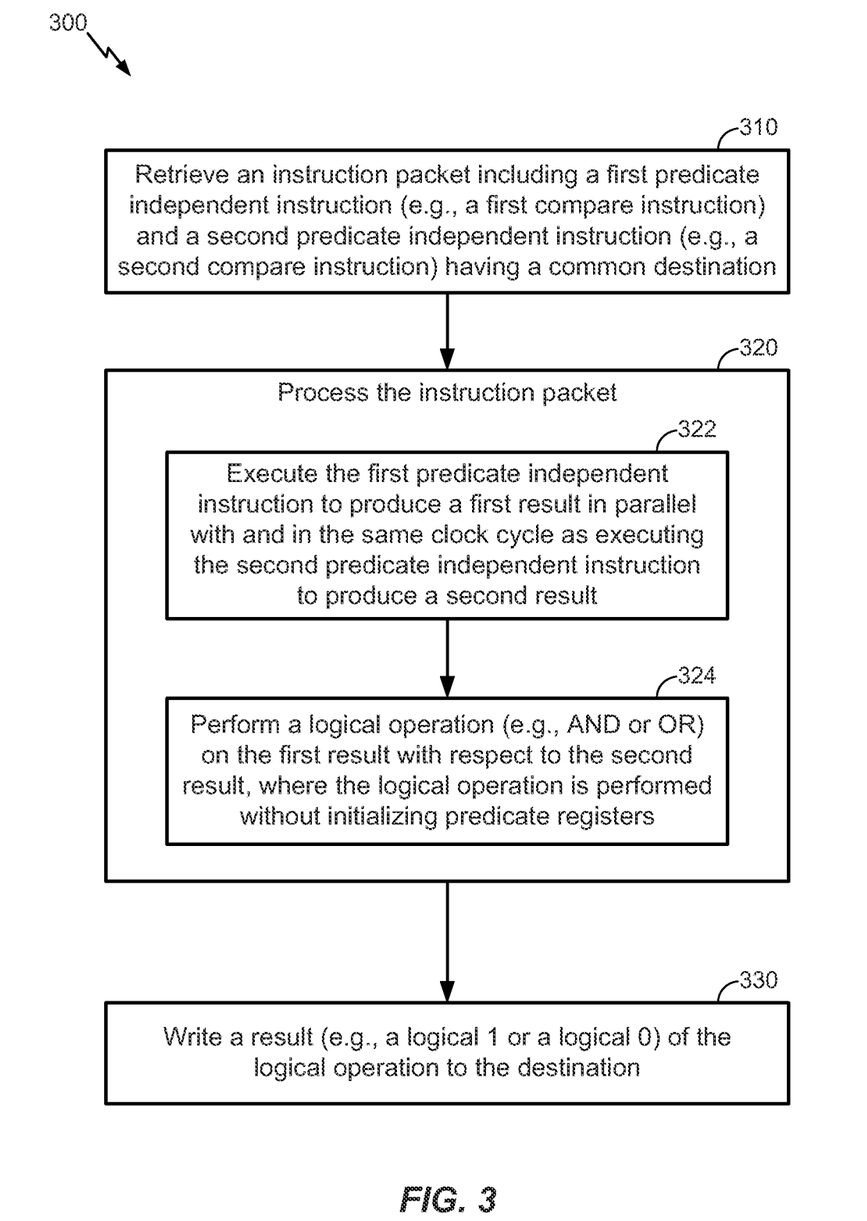
FIG. 3 is a flow chart of a particular illustrative embodiment of a method of retrieving and processing an instruction packet including a first predicate independent instruction and a second predicate independent instruction having a common destination.

Referring to FIG. 3, a particular illustrative embodiment of a method of retrieving and processing an instruction packet including a first predicate independent instruction and a second predicate independent instruction having a common destination is disclosed and generally designated 300. In an illustrative embodiment, the method 300 may be performed at the system 100 of FIG. 1 and illustrated with reference to FIG. 2.

The method 300 may include retrieving an instruction packet, the instruction packet including a first predicate independent instruction and a second predicate independent instruction having a common destination, at 310. For example, the instruction packet may be stored at the memory 102 of FIG. 1 or FIG. 2 or the instruction cache 110 of FIG. 1. The memory 102 may be a register-based memory, a random access memory (RAM), or any combination thereof The instruction packet may be the instruction packet 150 of FIG. 1 or FIG. 2 and may include the first predicate independent instruction 151 and the second predicate independent instruction 152.

The method 300 may also include processing the instruction packet, at 320, Processing the instruction packet 150 may include executing the first predicate independent instruction to produce a first result in parallel with and during the same clock cycle as executing the second predicate independent instruction to produce a second result, at 322. Processing the instruction packet may also include performing a logical operation (e.g., an AND operation or an OR operation) on the first result with respect to the second result, where the logical operation is performed without initializing predicate registers, at 324.

For example, processing of the instruction packet 150 may be performed by any two of the execution units 118, 120, 122, and 124 of FIG. 1. To illustrate, the execution unit 122 may execute the first predicate independent instruction 151 to produce the first result 160 and the execution unit 124 may execute the second predicate independent instruction 152 to produce the second result 170. In a particular embodiment, the first predicate independent instruction 151 may be a first compare instruction and the second, predicate independent instruction 152 may be a second compare instruction. Further, the first predicate independent instruction 151 may be executed in parallel with and in the same clock cycle as executing the second predicate independent instruction 152.

Further, a logic unit (e.g., the logic unit 138 of FIG. 1 or FIG. 2) may perform a logical operation on the first result with respect to the second result. For example, the logical operation may be an AND operation or an OR operation. The logical operation may be performed without initializing predicate registers, because the logical operation does not depend on the values stored in the predicate registers. For example, the logic operation may not be a typed AND operation that can only write a logical '0' and therefore require its destination to be initialized with a logical '1' or a typed. OR operation that can only write a logical '1' and therefore require its destination to be initialized with a logical '0.'

The method 300 may also include writing a result of the logical operation to the common destination, at 330. In a particular embodiment, the result of the logical operation may be a logical '1' value or a logical '0' value. For example, the logic unit 138 may write the result of the logical operation (e.g., a result of an AND operation or an OR operation) performed on the first result 160 with respect to the second result 170 to the first destination register 181 (i.e., the common destination register specified by the first predicate independent instruction 151 and the second predicate independent instruction 152). The method 300 of FIG. 3 may thus enable encapsulation and processing of complex conditional codes in a single instruction packet which may result in denser codes and more efficient processing at an electronic device.

Figure 4:
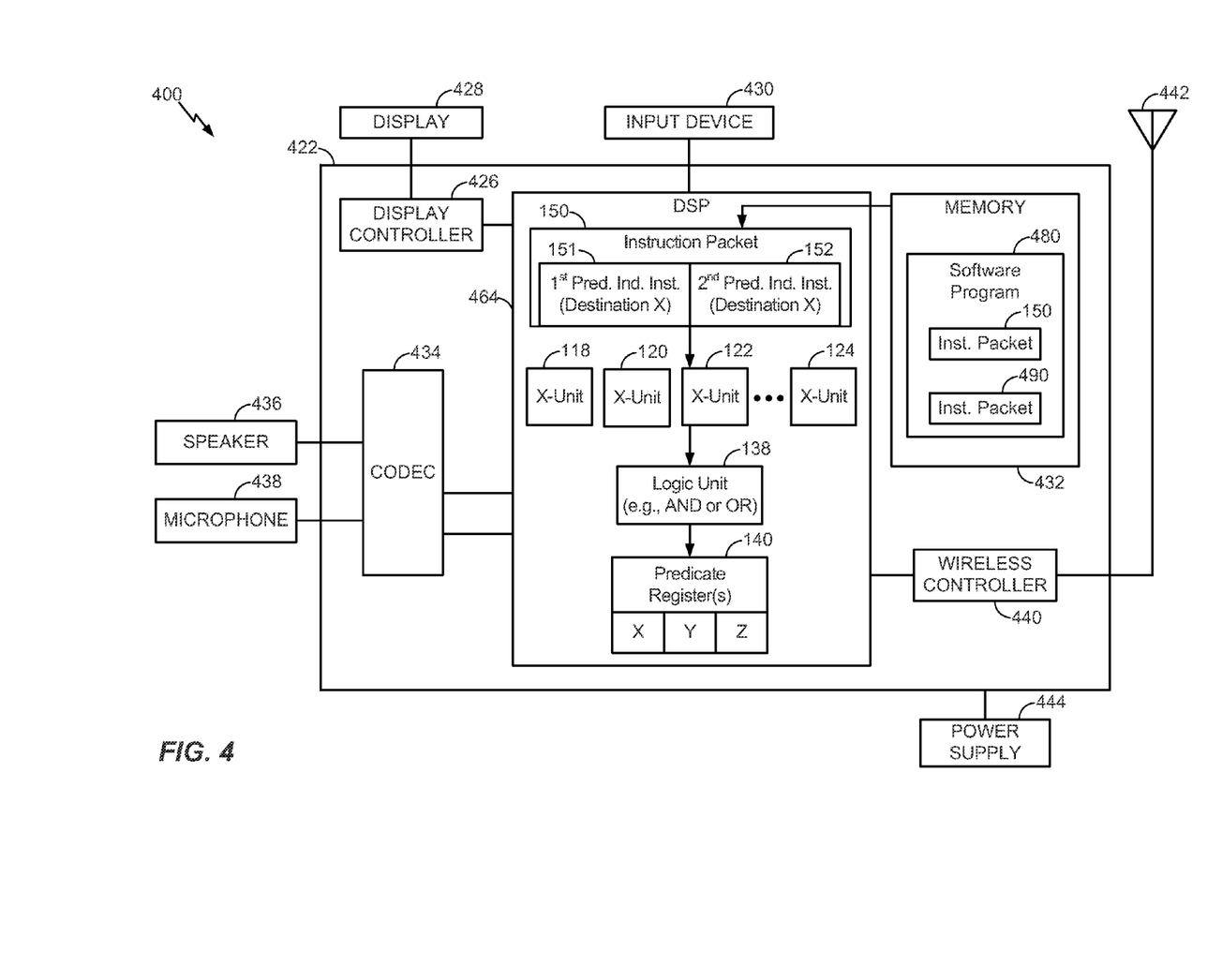
FIG. 4 is a block diagram of a wireless device including a processor operable to execute an instruction packet including multiple instructions having a common destination.

Referring to FIG. 4, a block diagram of a particular illustrative embodiment of a wireless device that includes a processor coupled to a memory storing an instruction packet including multiple instructions having a common destination is depicted and. generally designated 400. The device 400 includes a processor, such as a digital signal processor (DSP) 464, coupled to a memory 432. The memory 432 may store the instruction packet 150 of FIG. 1 and may transmit the instruction packet 150 to the DSP 464. The instruction packet 150 may include the first predicate independent instruction 151 and the second predicate independent instruction 152.

The DSP 464 may include execution units 118, 120, 122, and 124 that may receive and process the instruction packet 150 or instructions contained therein. For example, the execution unit 122 may execute the first predicate independent instruction 151 and the execution unit 124 may execute the second predicate independent instruction 152. The DSP 464 may also include the logic unit 138 to receive a first result of the first predicate independent instruction 151 and a second result of the second predicate independent instruction 152. The logic unit 138 may perform a logical operation (e.g., an AND operation or an OR operation) on the first result with respect to the second result.

The DSP 464 may also include a predicate register file 140 including a first predicate register designated 'X,' a second predicate register designated 'Y,' and a third predicate register designated 'Z.' The logic unit 138 may write a result of the logical operation to any of the predicate registers. For example, the result of the logical operation may be written to the first predicate register designated 'X.' In a particular embodiment, the result of the logical operation may be a logical '1' value or a logical '0' value.

It should be noted that the instruction packet 150 may be part of a set of instructions (e.g., a software program 480) executed by the DSP 464. Execution of the software program may include processing many such instruction packets 150, 490. For example, the software program 480 may be a system level program, an application level program (e.g., an interactive or multimedia program), or another program executable by the DSP 464.

FIG. 4 also shows a display controller 426 that is coupled to the DSP 464 and to a display 428. A coder/decoder (CODEC) 434 can also be coupled to the DSP 464. A speaker 436 and a microphone 438 can be coupled to the CODEC 434.

FIG. 4 also indicates that a wireless controller 440 can be coupled to the DSP 464 and to a wireless antenna 442. In a particular embodiment, the DSP 464, the display controller 426, the memory 432 including the instruction packet 150, the CODEC 434, and the wireless controller 440 are included, in a system-in-package or system-on-chip device 422. In a particular embodiment, an input device 430 and a power supply 444 are coupled to the system-on-chip device 422. Moreover, in a particular embodiment, as illustrated in FIG. 4, the display 428, the input device 430, the speaker 436, the microphone 438, the wireless antenna 442, and the power supply 444 are external to the system-on-chip device 422. However, each of the display 428, the input device 430, the speaker 436, the microphone 438, the wireless antenna 442, and the power supply 444 can be coupled to a component of the system-on-chip device 422, such as an interface or a controller.

It should be noted that although FIG. 4 depicts a wireless communications device, the DSP 464 and the memory 432 may also be integrated into a set top box, a music player, a video player, an entertainment unit, a navigation device, a personal digital assistant (PDA), a fixed location data unit, or a computer.

In conjunction with the described embodiments, an apparatus is disclosed that includes means for storing an instruction packet including a first predicate independent instruction and a second predicate independent instruction having a common destination. For example, the means for storing may be the memory 102 of FIG. 1 or FIG. 2, the instruction cache 110 of FIG. 1, the memory 432 of FIG. 4, or one or more other devices configured to store an instruction packet, or any combination thereof.

The apparatus may further include means for retrieving the instruction packet from the means for storing. For example, the means for retrieving may be the bus 111 of FIG. 1, the bus 130 of FIG. 1, the bus interface 108 of FIG. 1, the sequencer 114 of FIG. 1, an execution pipeline, or one or more other devices configured to retrieve an instruction packet, or any combination thereof.

The apparatus may also include means for processing the instruction packet by performing a logical operation on a first result of the first predicate independent instruction of the instruction packet with respect to a second predicate independent instruction of the instruction packet. For example, the means for processing may include one or more of the execution units 118, 120, 122, and 124 of FIG. 1, one or more of the execution units 122 and 124 of FIG. 2, one or more of the execution units 118, 120, 122, and 124 of FIG. 4, the logic unit 138 of FIG. 1, the logic unit 138 of FIG. 2, the logic unit 138 of FIG. 4, one or more devices configured to process an instruction packet, or any combination thereof.

The apparatus may further include means for writing a result of the logical operation to a destination. The means for writing may include a write port of a logic unit and a read port of a destination register. The logic unit may be the logic unit 138 of FIG. 1, FIG. 2, FIG. 4, or one or more devices configured to perform a logical operation and write the result of the logical operation to a destination register. The destination register may be the predicate register file 140 or a register therein (e.g., the first predicate register designated 'X', the second predicate register designated 'Y,' or the third predicate register designated 'Z') of FIG. 1 and FIG. 2, and the general register file 126 of FIG. 1.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied, to other embodiments without departing from the scope of the disclosure. Thus, the present disclosure is not intended to he limited to the embodiments shown herein but is to be accorded the widest scope possible consistent with the principles and novel features as defined by the following claims.

What is claimed is:

1. An apparatus comprising:
   a processor; and
   a memory coupled to the processor, wherein the memory stores an instruction packet, the instruction packet including a first predicate independent instruction having a destination and a second predicate independent instruction having the same destination;
   wherein processing of the instruction packet at the processor includes performing a logical operation on a first result of the first predicate independent instruction with respect to a second result of the second predicate independent instruction, and wherein a value written to the destination corresponds to a result of the logical operation.

2. The apparatus of claim 1, wherein the first predicate independent instruction is a first compare instruction and the second predicate independent instruction is a second compare instruction.

3. The apparatus of claim 2, wherein the first compare instruction, the second compare instruction, and the logical operation are executed in a single execution cycle of the processor.

4. The apparatus of claim 1, wherein the logical operation is an AND type operation or an OR type operation and wherein a result of the logical operation is written to the destination.

5. The apparatus of claim 4, wherein the logical operation writes a logical one value or a logical zero value resulting from the logical operation to the destination.

6. The apparatus of claim 1, wherein the destination is a predicate register.

7. The apparatus of claim 1, wherein the memory is an instruction cache, a register-based memory, a random access memory (RAM), or any combination thereof.

8. The apparatus of claim 1, further comprising a device selected from the group consisting of a set top box, a music player, a video player, an entertainment unit, a navigation device, a personal digital assistant (PDA), a fixed location data unit, and a computer, into which the processor and the memory are integrated.

9. The apparatus of claim 1, further comprising a wireless communications device into which the processor and the memory are integrated.

10. The apparatus of claim 1, wherein the instruction packet includes at least two compare instructions, wherein a result predicate stored in the destination is set to true when each of the at least two compare instructions has a true result, and wherein the result predicate stored in the destination is set to false when any of the at least two compare instructions has a false result.

11. An apparatus comprising:
    a processor; and
    a memory coupled to the processor, wherein the memory stores an instruction packet, the instruction packet including a first untyped instruction having a destination and a second untyped instruction having the same destination;
    wherein processing of the instruction packet at the processor includes performing a logical operation on a first result of the first untyped instruction with respect to a second result of the second untyped instruction to generate a third result, and wherein processing is performed independent of a value of the first result or a value of the second result.

12. The apparatus of claim 11, wherein the first untyped instruction is a first compare instruction and the second untyped instruction is a second compare instruction and wherein the third result is written to the destination.

13. The apparatus of claim 11, wherein the first untyped instruction and the second untyped instruction are each independent of a type of the logical operation, wherein the type of the logical operation is an AND type or an OR type.

14. A method comprising:
    retrieving, by an execution pipeline, an instruction packet stored at a memory, the instruction packet including a first predicate independent instruction having a destination and a second predicate independent instruction having the same destination; and
    processing the instruction packet by performing a logical operation on a first result of the first predicate independent instruction with respect to a second result of the second predicate independent instruction, wherein a value written to the destination corresponds to a result of the logical operation.

15. The method of claim 14, wherein the logical operation is performed without initializing predicate registers, wherein the result of the logical operation is written to the destination and wherein the destination is a predicate register, wherein the first predicate independent instruction is a first compare instruction, and wherein the second predicate independent instruction is a second compare instruction.

16. The method of claim 14, wherein processing the instruction packet further comprises:
    executing the first predicate independent instruction to produce the first result; and
    executing the second predicate independent instruction to produce the second result, wherein the first predicate independent instruction is executed during the same clock cycle as the second predicate independent instruction.

17. A non-transitory computer-readable medium including program code that, when executed by a processor, causes the processor to:
    process an instruction packet by performing a logical operation on a first result of a first predicate independent instruction of the instruction packet with respect to a second result of a second predicate independent instruction of the instruction packet,
    wherein the first predicate independent instruction has a destination and the second predicate independent instruction has the same destination and wherein a value written to the destination corresponds to a result of the logical operation.

18. The non-transitory computer-readable medium of claim 17, wherein the first predicate independent instruction is a first compare instruction and the second predicate independent instruction is a second compare instruction.

19. An apparatus comprising:
- means for storing an instruction packet, the instruction packet including a first predicate independent instruction having a destination and a second predicate independent instruction having the same destination;
- means for retrieving the instruction packet from the means for storing; and
- means for processing the instruction packet by performing a logical operation on a first result of the first predicate independent instruction of the instruction packet with respect to a second result of a second predicate independent instruction of the instruction packet, wherein a value written to the destination corresponds to a result of the logical operation.

20. The apparatus of claim 19, further comprising means for writing a result of the logical operation to the destination, wherein the first predicate independent instruction is a first compare instruction and the second predicate independent instruction is a second compare instruction.

* * * * *